F. LOBNITZ.
LUBRICATING DEVICE.
APPLICATION FILED FEB. 1, 1909.

1,020,210.

Patented Mar. 12, 1912.
2 SHEETS—SHEET 1.

Witnesses:
P. F. Nagle.
L. Douville.

Inventor:
Fred Lobnitz.
By Wiederheim & Fairbanks
Attorneys

F. LOBNITZ.
LUBRICATING DEVICE.
APPLICATION FILED FEB. 1, 1909.
1,020,210.
Patented Mar. 12, 1912.
2 SHEETS—SHEET 2.
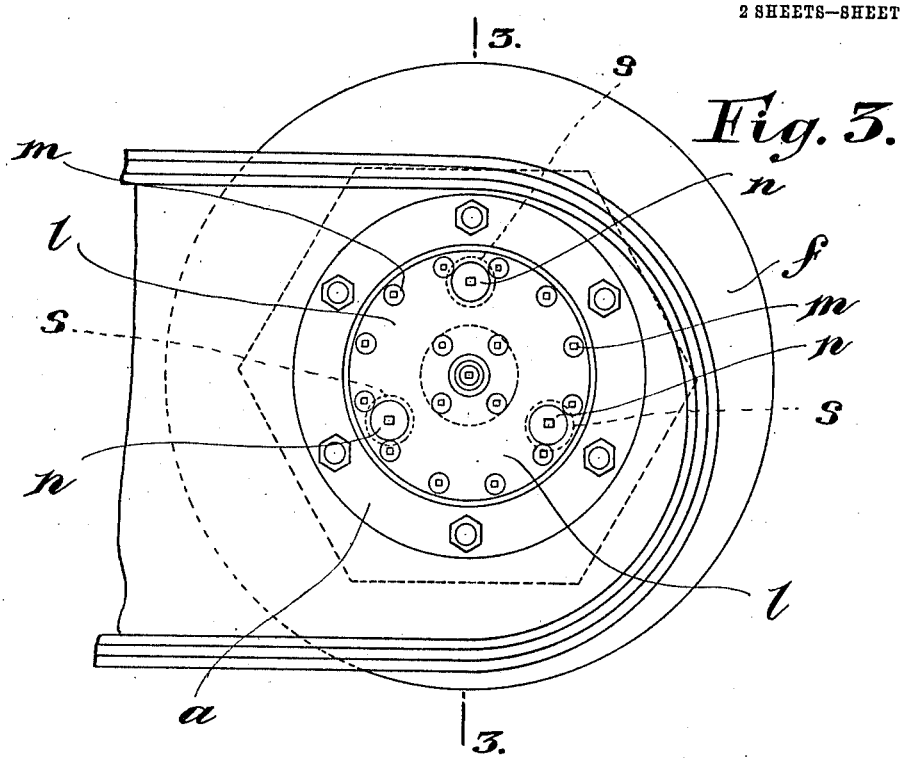
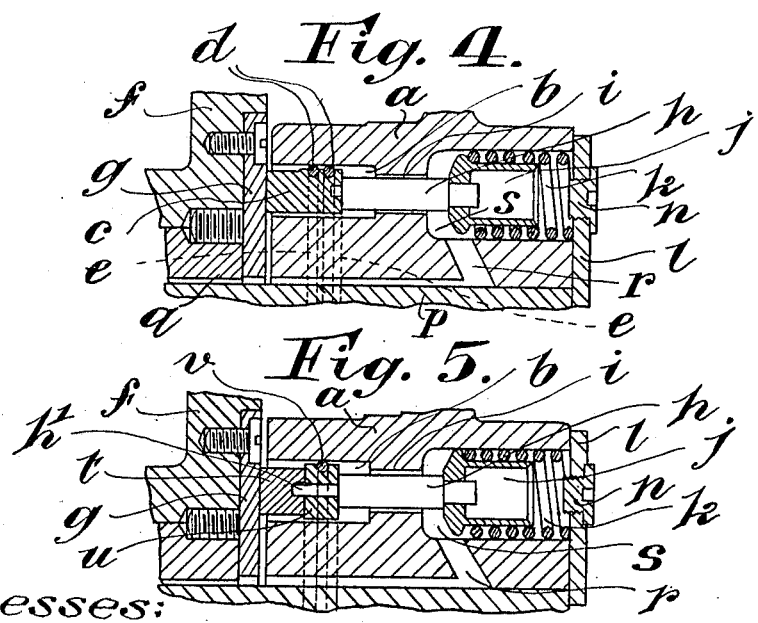
Witnesses:
P. F. Nagle.
L. Douville.
Inventor
Fred Lobnitz
By Wiedersheim & Fairbank
Attorneys.

UNITED STATES PATENT OFFICE.

FRED LOBNITZ, OF RENFREW, SCOTLAND.

LUBRICATING DEVICE.

1,020,210.  Specification of Letters Patent.  Patented Mar. 12, 1912.

Application filed February 1, 1909. Serial No. 475,392.

*To all whom it may concern:*

Be it known that I, FRED LOBNITZ, a subject of the King of Great Britain, residing at Renfrew, Scotland, have invented a certain new and useful Lubricating Device, of which the following is a specification.

This invention relates to the bearings of bodies which work under water and specially to the bearings of the bottom tumblers of bucket dredgers the object of the invention being to provide an improved device whereby the same can be efficiently lubricated while at the same time sand and water are excluded from the bearing.

I will now proceed to describe my invention fully and clearly reference being made to the accompanying drawings, whereon:—

Figure 1:
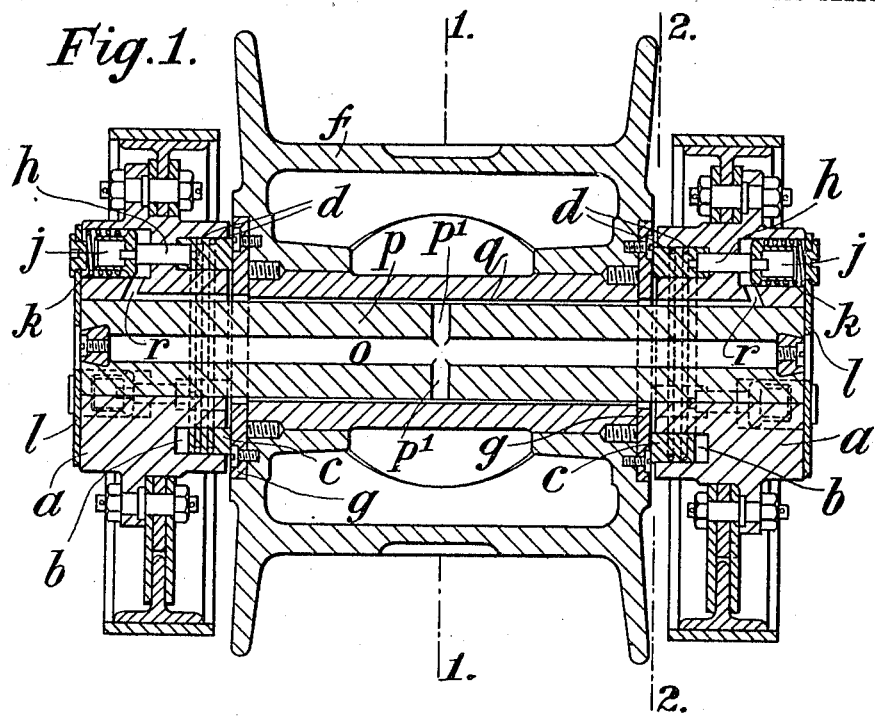
Figure 2:
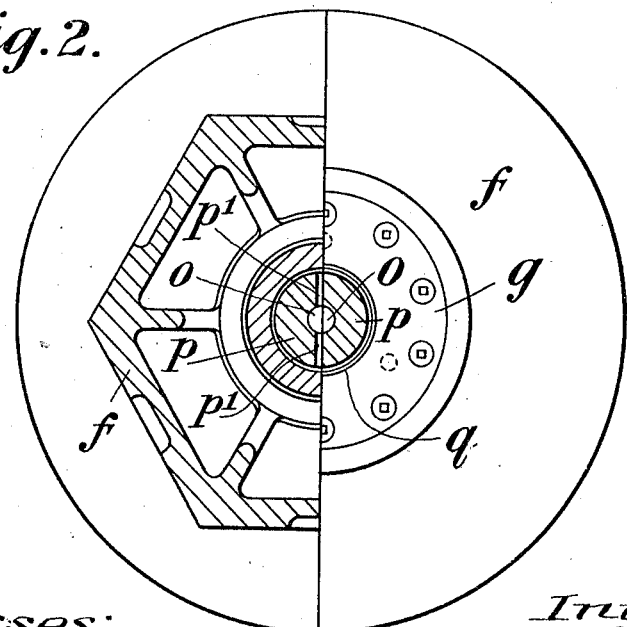

Figure 1 is a section of a bottom tumbler of a bucket dredger with my present invention applied thereto. Fig. 2 is a half section on the line 1—1, Fig. 1 and a half section on the line 2—2 Fig. 1. Fig. 3 is a side elevation of the bottom tumbler and part of the ladder. Figs. 4 and 5 are enlarged detail sections, showing two slightly different methods of constructing the parts of the device.

Under my present invention I make the ladder end-brackets or fixed members $a$, $a$, each with a deep annular channel $b$ of rectangular section and in this channel I fit a metallic or other suitable ring $c$ which can work freely in the channel and is kept water-tight by means of one or more circumferential packing rings $d$, $d$, which are preferably made of rubber and rest in circumferential grooves $e$, $e$, (see Fig. 4).

The bottom tumbler or rotating member $f$ has set flush into it, at each side, a bearing ring $g$ and against these rings the rings $c$ are pressed tightly each by three or other suitable number of pins $h$, each working through a guide hole $i$ in the end bracket and having, at its outer end, a cup $j$ which is acted on by a spring $k$. The springs $k$, at each side of the bottom bracket, are held in place by means of a plate $l$ which, again, is secured to the bottom bracket by studs $m$. $n$ are cleaning plugs. The lubricant, which may be forced, is led to the passage $o$ in the shaft $p$ and passes, by the holes $p^1$, into the annular space $q$ between the shaft and the sleeve or lining of the tumbler. The lubricant can also pass, by the passages $r$, to the recesses $s$ in the end bracket and so lubricate the ring $c$, the guide pins $h$, and springs $k$. After the passages are filled with lubricant the ends of the passages $o$ can be closed by screw plugs. The rings $c$ and $d$ serve to exclude sand and water as well as retain the lubricant in place. The arrangement not only facilitates the easy rotation and working of the tumbler but allows it to have a certain amount of lateral play, against the action of the springs, without admission of sand and water to the bearing.

In the modification shown at Fig. 4 a metal ring $c$ is used, but, in the arrangement shown at Fig. 5, a hard rubber ring $t$, is used, said ring being backed and held in place by a second metal ring $u$ having a small circumferential packing ring $v$ thereon. It will be seen that the reduced end $h^1$ of the pin $h$ passes through the ring $u$ into the ring $t$ and fastens both together. Instead of using rubber rings $d$ or $v$, metal rings may be employed.

Having now fully described my invention what I claim and desire to secure by Letters Patent is:—

1. A device such as described comprising, in combination, fixed members each having a channel therein, a shaft carried by said members, a rotating member, a metal ring fitted movably in each channel, circumferential packing rings on said metal rings, a pin connected with each metal ring means whereby said metal rings and pins can be lubricated and elastic means acting on each pin.

2. A device such as described, comprising, in combination, fixed members each having an annular channel therein, a shaft carried by said members, a rotating member, a metal ring fitted movably in each channel circumferential packing rings on said metal rings, a pin connected with each metal ring means whereby said metal rings and pins can be lubricated and elastic means acting on each pin.

3. A device such as described comprising, in combination, fixed members each having a channel therein, a shaft carried by said members, a rotating member, a metal ring fitted movably in each channel, circumferential packing rings on said metal rings, a pin connected with each metal ring, a cup on each pin, and springs bearing on the cups.

4. A device such as described, comprising, in combination, fixed members each having a channel therein, a shaft carried by said members, a rotating member, a metal ring fitted movably in each channel, circumferential packing rings on said metal rings, a pin connected with each metal ring, a cup on each pin, springs bearing on the cups and means for retaining the springs in place.

5. In combination, fixed members each having an annular channel therein at one side thereof, a series of recesses at the opposite side thereof and openings connecting the aforesaid channel and recesses, annular bearing means arranged in the channel, a circumferential packing ring on said bearing means, elastic means in said recesses and acting on said bearing means, a shaft and a rotating member on the shaft.

6. In combination, a fixed member having an annular channel therein at one side thereof, a series of recesses at the opposite side thereof and openings connecting the aforesaid channel and recesses, means for supplying lubricant to said recesses and channel, annular bearing means arranged in the channel, a circumferential packing ring on said bearing means, elastic means in said recesses and acting on said bearing means, a shaft and a rotating member on the shaft.

7. In combination, a rotating member, a shaft therefor, two end brackets carrying the shaft each bracket having an annular channel therein at one side thereof, an annular bearing ring within the channel of each bracket and acting against the said rotating member, a packing ring around the outer circumference of each bearing ring, means for lubricating the channels the bearing rings and the packing rings, and elastic means arranged in the brackets and acting on said bearing rings for forcing the bearing ring against the rotating member.

8. In combination, a rotating member, a shaft therefor, two end brackets carrying the shaft and holding the same fixedly in position between them each bracket having an annular channel therein at one side thereof, means for supplying lubricant to said channels, a bearing ring arranged in the channel of each bracket, packing rings arranged on the outer circumference of each bearing ring and a spring acting on each bearing ring so as to push the same tightly against the rotating member.

9. In combination, a rotating member, a shaft therefor, brackets carrying the shaft, each bracket having an annular channel therein at the one side thereof and a series of recesses at the other side thereof, a movable ring arranged in each annular channel, pins connected to the rings and projecting into the said recesses, springs bearing on the pins and means for closing the said recesses.

10. In combination, a rotating member, a shaft therefor, brackets carrying the shaft, each bracket having an annular channel therein at the one side thereof and a series of recesses at the other side thereof, a movable ring arranged in each annular channel, means for packing said rings, pins connected to the rings and projecting into the said recesses, springs bearing on the pins, means for closing said recesses and means for lubricating said springs, pins and rings.

11. In combination, a rotating member, a shaft therefor, brackets carrying the shaft, each bracket having an annular channel therein at the one side thereof and a series of recesses at the other side thereof, a movable ring arranged in each annular channel, pins connected to the rings and projecting into the said recesses, springs bearing on the pins, and means for closing the said recesses, the said brackets having channels therein whereby lubricant can be supplied to each recess.

In testimony whereof I affix my signature in presence of two witnesses.

FRED LOBNITZ.

Witnesses:
JAMES R. WOOD,
GAVIN GREIG.

Copies of this patent may be obtained for five cents each, by addressing the "Commissioner of Patents, Washington, D. C."